United States Patent
Hsieh

(10) Patent No.: US 9,344,076 B2
(45) Date of Patent: May 17, 2016

(54) BYPASS CIRCUITS AND NETWORK SECURITY DEVICES USING THE SAME

(71) Applicant: Accton Technology Corporation, Hsinchu (TW)

(72) Inventor: Cheng-Che Hsieh, Taipei (TW)

(73) Assignee: ACCTON TECHNOLOGY CORPORATION, Hsinchu (TW)

( * ) Notice: Subject to any disclaimer, the term of this patent is extended or adjusted under 35 U.S.C. 154(b) by 19 days.

(21) Appl. No.: 14/316,059

(22) Filed: Jun. 26, 2014

(65) Prior Publication Data

US 2015/0326214 A1    Nov. 12, 2015

(30) Foreign Application Priority Data

May 8, 2014  (TW) .............................. 103116357 A

(51) Int. Cl.
*H03K 17/00* (2006.01)
*G06F 21/85* (2013.01)

(52) U.S. Cl.
CPC .............. *H03K 17/005* (2013.01); *G06F 21/85* (2013.01)

(58) Field of Classification Search
CPC .............................. H03K 17/005; G06F 21/85
USPC ................. 327/365, 565, 566; 326/37, 38, 41
See application file for complete search history.

(56) References Cited

U.S. PATENT DOCUMENTS

| | | | | |
|---|---|---|---|---|
| 5,412,261 A | * | 5/1995 | Whitten | H01L 23/5252 257/E23.147 |
| 7,876,120 B2 | * | 1/2011 | Awaji | G01R 31/31924 324/750.3 |
| 8,441,298 B1 | * | 5/2013 | Williams | H03K 19/1732 326/41 |
| 9,117,651 B2 | * | 8/2015 | Simmonds | H01L 25/00 |

FOREIGN PATENT DOCUMENTS

| | | |
|---|---|---|
| CN | 201752118 U | 2/2011 |
| TW | 201115971 A1 | 5/2011 |

* cited by examiner

*Primary Examiner* — Kenneth B Wells
(74) *Attorney, Agent, or Firm* — Birch, Stewart, Kolasch & Birch, LLP

(57) ABSTRACT

A bypass circuit is provided. The bypass circuit is integrated in a single chip. The bypass circuit includes a first pin set, a second pin set, an output pin set, and a switching circuit. The first pin set receives a first input signal from outside of the single chip. The switching circuit is coupled to the first pin set and transmits the first input signal to the second pin set or the output pin set.

8 Claims, 8 Drawing Sheets

US 9,344,076 B2

BYPASS CIRCUITS AND NETWORK SECURITY DEVICES USING THE SAME

CROSS REFERENCE TO RELATED APPLICATIONS

This Application claims priority of Taiwan Patent Application No. 103116357, filed on May 8, 2014, the entirety of which is incorporated by reference herein.

BACKGROUND OF THE INVENTION

1. Field of the Invention

The invention relates to a network security device, and more particularly to a bypass circuit integrated in a single chip.

2. Description of the Related Art

Generally, a network security apparatus is applied between two or more networks, such as between Intranet and Internet. An application process of the network security apparatus can analyze network packages or signals passing therethrough to determine whether Internet safety risks exist in the networks. After the analysis, the network packages or signals are then transmitted by predetermined routes. When the network security apparatus fails, such as when the power supply is interrupted or when the system crashes, the networks connected to the network security apparatus will not communicate with each other. At this time, if the networks are requested to be remaining a state of communication, a bypass circuit is required.

Through a specific trigger state (an interruption of the power supply or a system crash), the bypass circuit allows two networks to be directly connected to each other in physical connection form without suffering the security application process of the network security apparatus. Thus, if there is a bypass circuit, when the network security apparatus fails, the networks connected to the network security apparatus can still communicate with each other. At this time, the network security apparatus does not perform the security application process to the network packages or signals any more.

Using a conventional network security apparatus each of whose network connectors has eight pins as an example, a bypass circuit for a pair of network connectors is composed of nine relays. The hardware lines between the nine relays occupy space and require greater complexity in circuitry design. Moreover, instantaneous current is generated when the relays are larger. The conventional network security apparatus does not conform to the tendency toward smaller size and low power consumption in circuitry design.

BRIEF SUMMARY OF THE INVENTION

An exemplary embodiment of a bypass circuit is provided. The bypass circuit is integrated in a single chip. The bypass circuit comprises a first pin set, a second pin set, an output pin set, and a switching circuit. The first pin set receives a first input signal from outside of the single chip. The switching circuit is coupled to the first pin set and transmits the first input signal to the second pin set or the output pin set.

An exemplary embodiment of a network security device is provided. The network security device comprises a plurality of connector pair sets, a network transmission controller, and a plurality of bypass circuits. The network transmission controller performs secure signal transmission between the plurality of connector pair sets. Each of the plurality of bypass circuits is coupled to one of the plurality of connector pair sets. Each of the plurality of bypass circuits controls signal transmission between the network transmission controller and one of the plurality of connector pair sets. Each of the plurality of bypass circuits is integrated in a single one chip and comprises a first pin set, a second pin set, an output pin set, and a switching circuit. The first pin set is coupled to a first connector of the corresponding connector pair set to receive a first input signal from the first connector. The output pin set is coupled to the network transmission controller. The switching circuit is coupled to the first pin set and transmits the first input signal to the second pin set or the output pin set.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
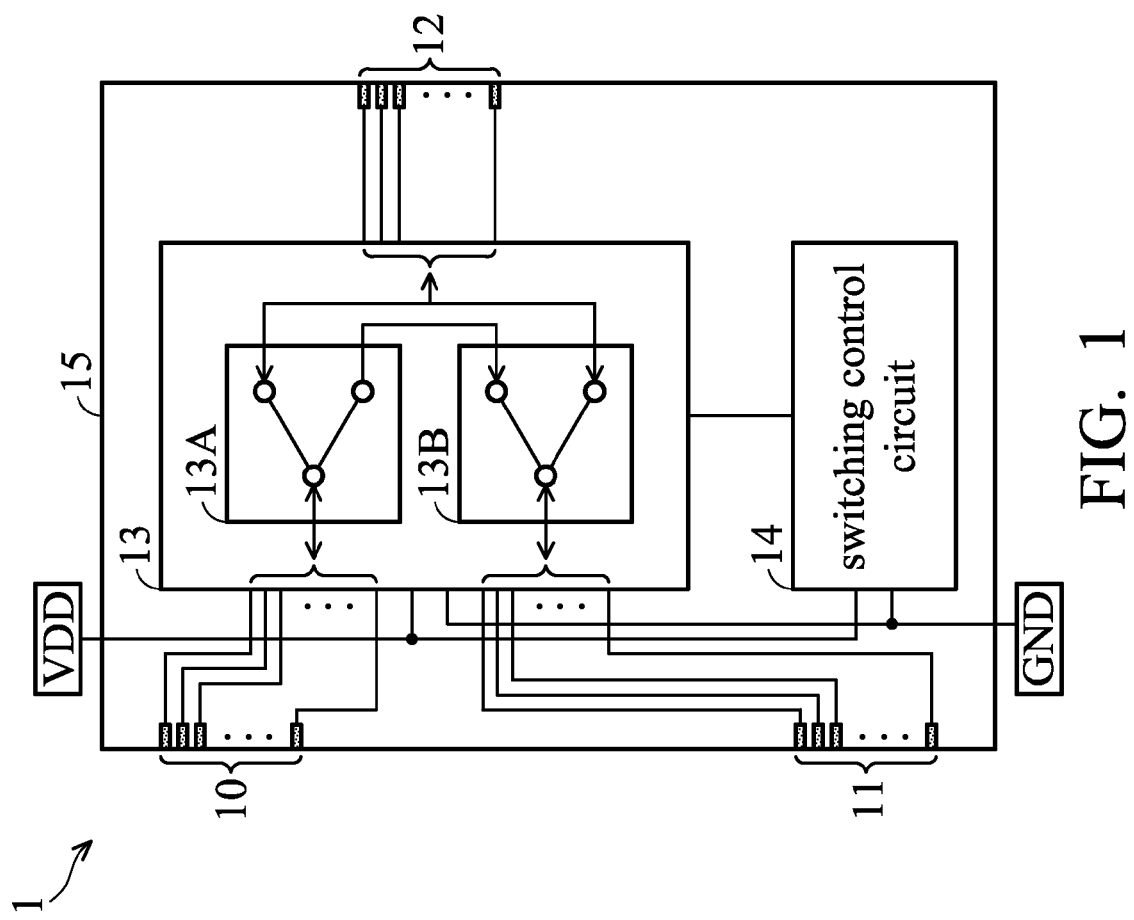
FIG. 1 shows an exemplary embodiment of a bypass circuit.

The following description is of the best-contemplated mode of carrying out the invention. This description is made for the purpose of illustrating the general principles of the invention and should not be taken in a limiting sense. The scope of the invention is best determined by reference to the appended claims.

Bypass circuits are provided. In an exemplary embodiment of a bypass circuit 1, a bypass circuit 1 comprises two pin sets 10 and 11, an output pin set 12, a switching circuit 13, and a switching control circuit 14. In the embodiment, the bypass circuit 1 is integrated in a single one chip 15, e.g. the pin sets 10 and 11, the output pin set 12, the switching circuit 13, and the switching control circuit 14 are packaged in a single one chip 15. The switching circuit 13 is coupled between the pin sets 10 and 11 and the output pin set 12. In the embodiment, the switching circuit 13 comprises a plurality of relay circuits. The number of relay circuits is determined by the number of pins of the pin sets 10 and 11. For example, when each of the pin sets 10 and 11 has eight pins, the number of relay circuits in the switching circuit 13 is nine. In order to simply illustrate by figures, in FIG. 1, relay circuits 13A and 13B are used to represent the plurality of relay circuits disposed between the pin sets 10 and 11 and the output pin set 12. The switching circuit 13 performs a switching operation to achieve a transmission path between the pin set 10/11 and the output pin set 12 or a transmission path between the pin set 10 and the pin set 11. In other words, the switching switch 13 performs the switching operation for signal transmission between the pin set 10/11 and the output pin set 12 or between the pin set 10 and the pin set 11.

Figure 2A:
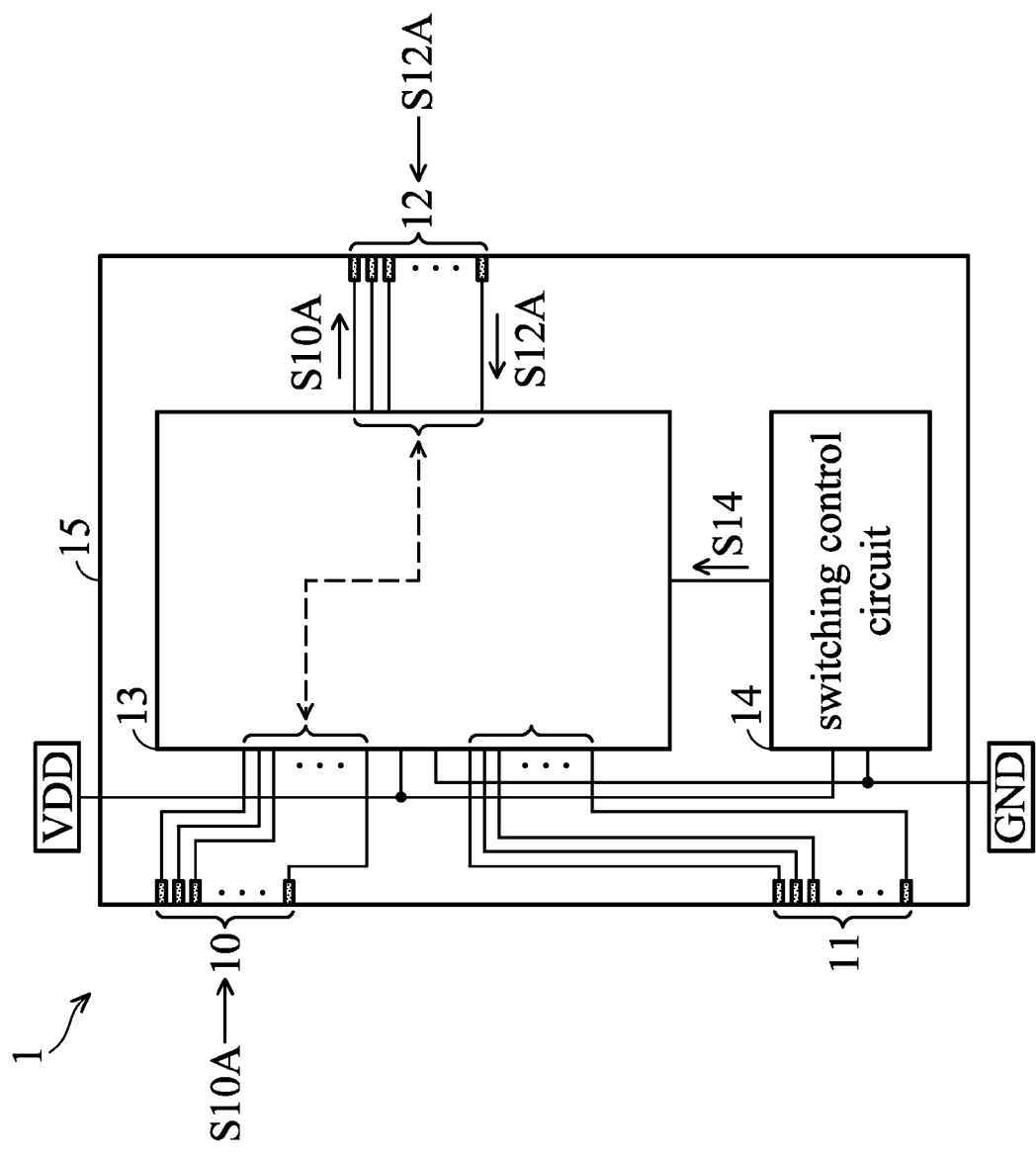
FIGS. 2A-2C show signal transmission of the bypass circuit in FIG. 1 in different situations.
Figure 2B:
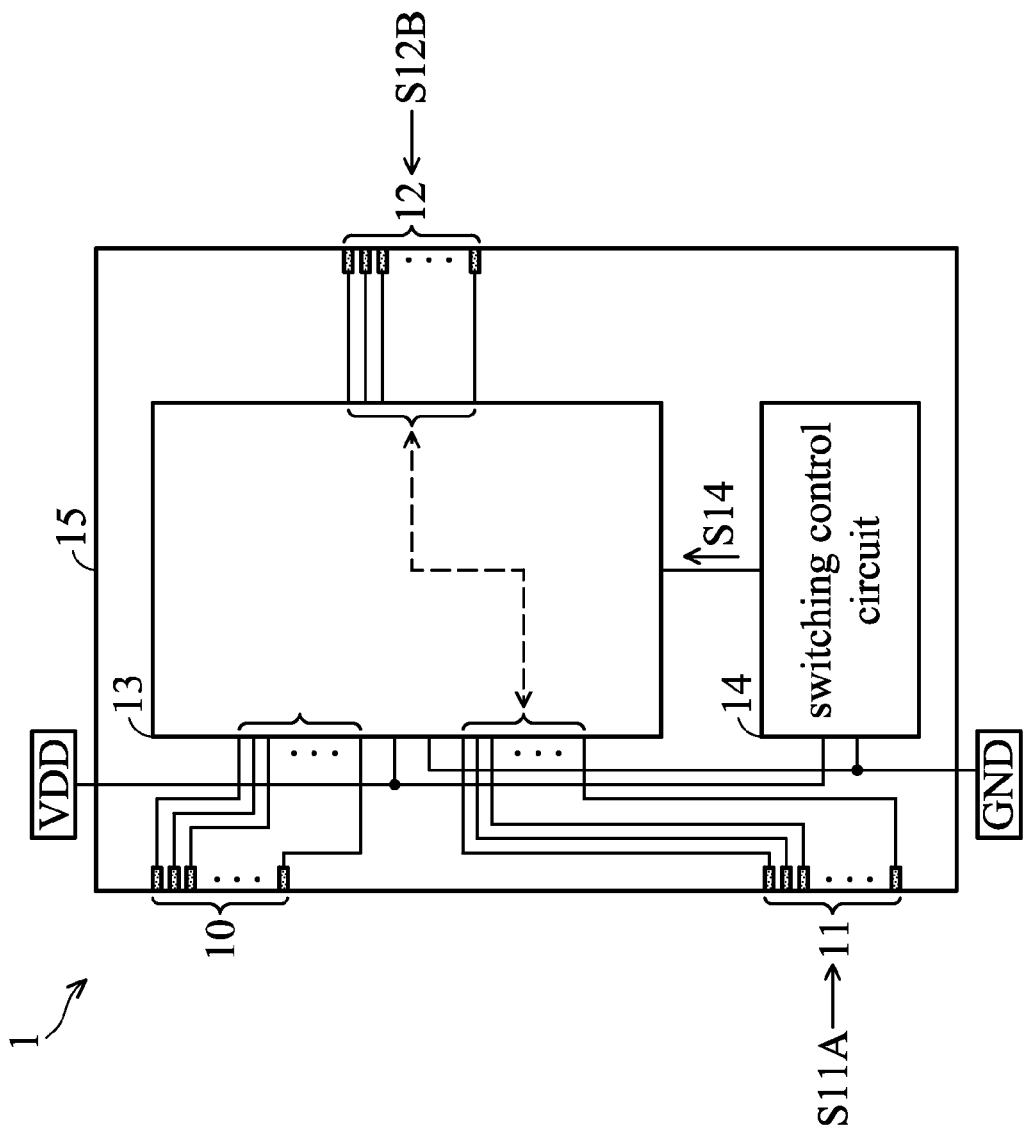
Figure 2C:
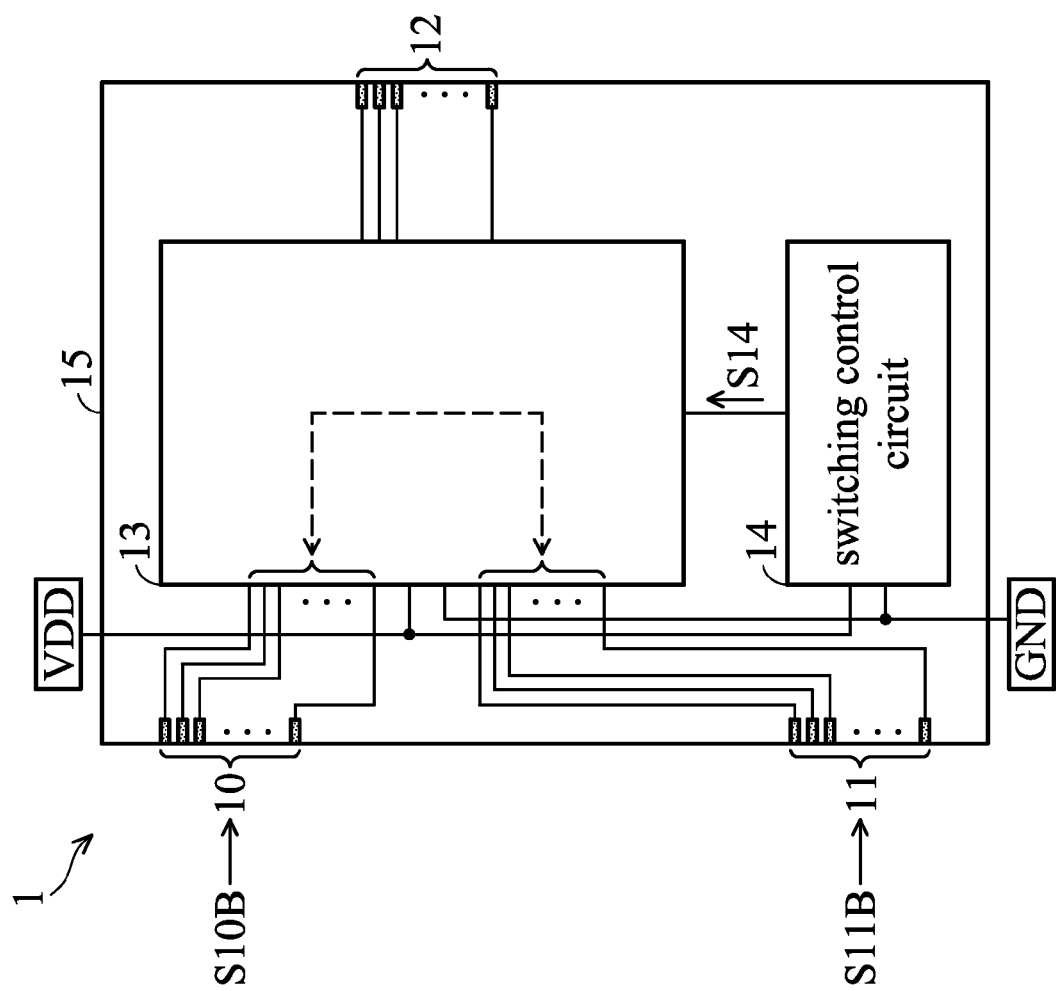

For example, referring to FIG. 2A, when the switching circuit 13 is in a switching state applied to achieve the transmission path between the pin set 10 and the output pin set 12, through the switching of the relay circuits, an input signal S10A which is provided from the outside of the single chip 15 (that is, the outside of the bypass circuit 1) and received by the pin set 10 is transmitted to the output pin set 14, and another input signal S12A which is provided from the outside of the single chip 15 and received by the output pin set 12 is transmitted to the pin set 10. Similarly, referring to FIG. 2B, when the switching circuit 13 is in a switching state applied to achieve the transmission path between the pin set 11 and the output pin set 12, through the switching of the relay circuits, an input signal S11A which is provided from the outside of the single chip 15 and received by the pin set 11 is transmitted to the output pin set 12, and another input signal S12B which is provided from the outside of the single chip 15 and received by the output pin set 12 is transmitted to the pin set 11. In another case, referring to FIG. 2C, when the switching circuit 13 is in a switching state applied to achieve the transmission path between the pin set 10 and the pin set 11, through the switching of the relay circuits, an input signal S10B which is provided from the outside of the single chip 15 and received by the pin set 10 is transmitted to the pin set 11, and another input signal S11B which is provided from the outside of the single chip 15 and received by the pin set 11 is transmitted to the pin set 10. The switching control circuit 14 receives a control signal provided from the outside of the single chip 15 and thus generates a switching signal S14 to control the above-described switching operation of the switching circuit 13.

In the embodiment of FIG. 1, the switching circuit 13 and the switching control circuit 14 are powered by the same power domain. For example, the switching circuit 13 and the switching control circuit 14 receive the same supply voltage VDD and the same ground voltage GND.

According to the above description, the pin sets 10 and 11, the output pin set 12, the switching circuit 13, and the switching control circuit 14 are packaged in a single chip 15. In this single chip 15, the pin sets 10 and 11, the output pin set 12, the switching circuit 13, and the switching control circuit 14 are disposed on the same circuit substrate by the same manufacturing process. In an embodiment, the same manufacturing process is a microelectromechanical system (MEMS) process.

Figure 3:
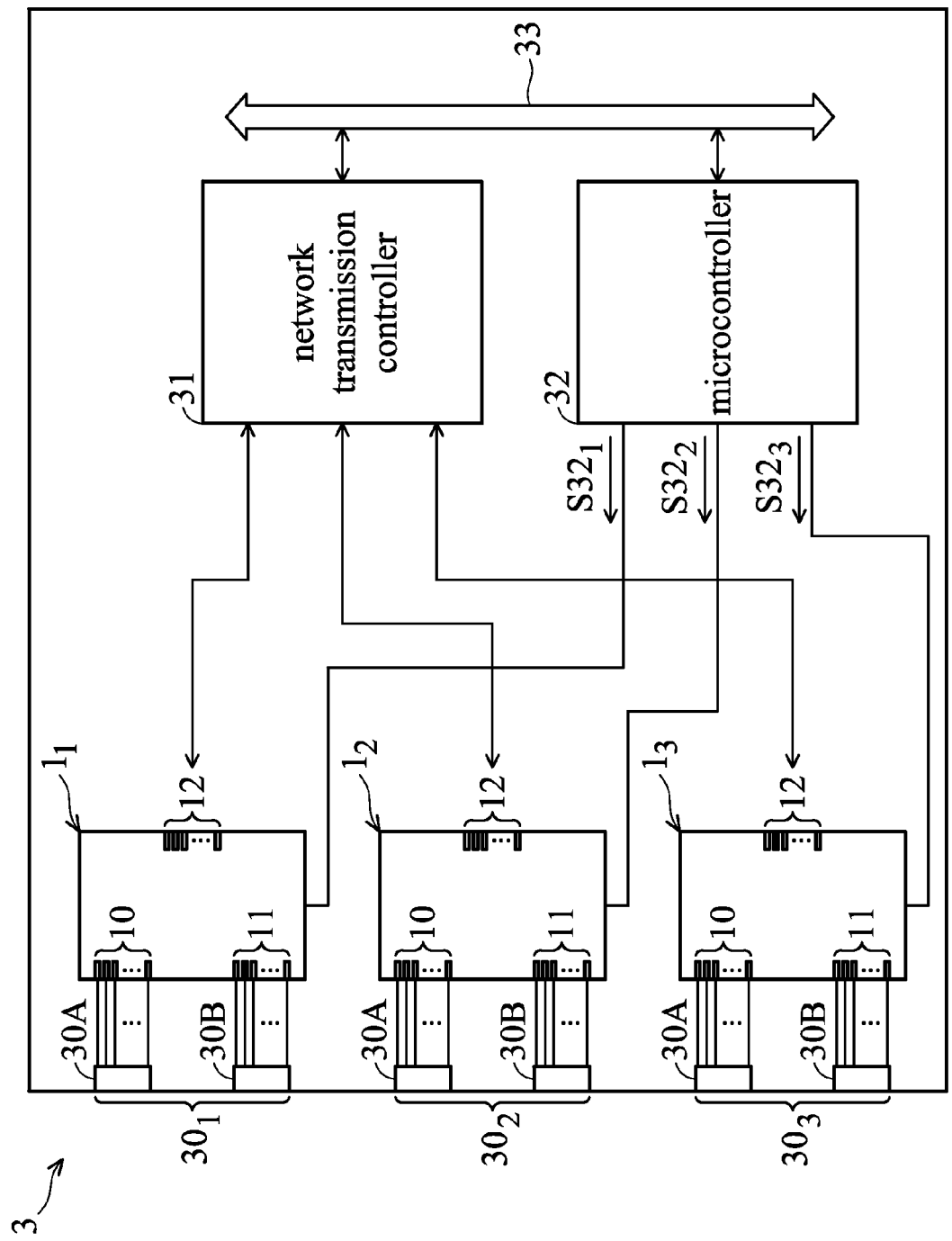
FIG. 3 shows an exemplary embodiment of a network security device.
Figure 4A:
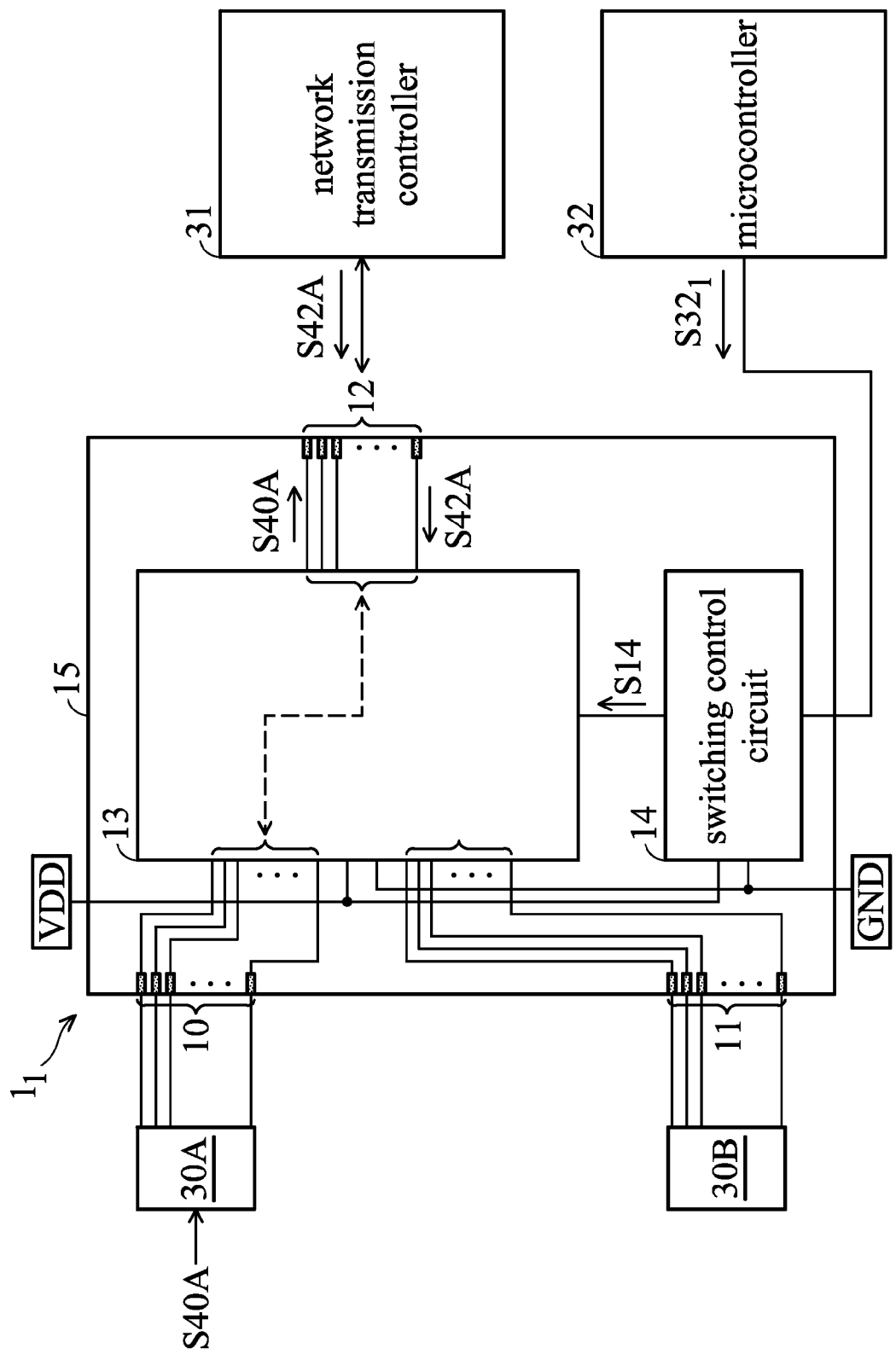
FIGS. 4A-4C show signal transmission of the network security device in FIG. 3 in different situations.
Figure 4B:
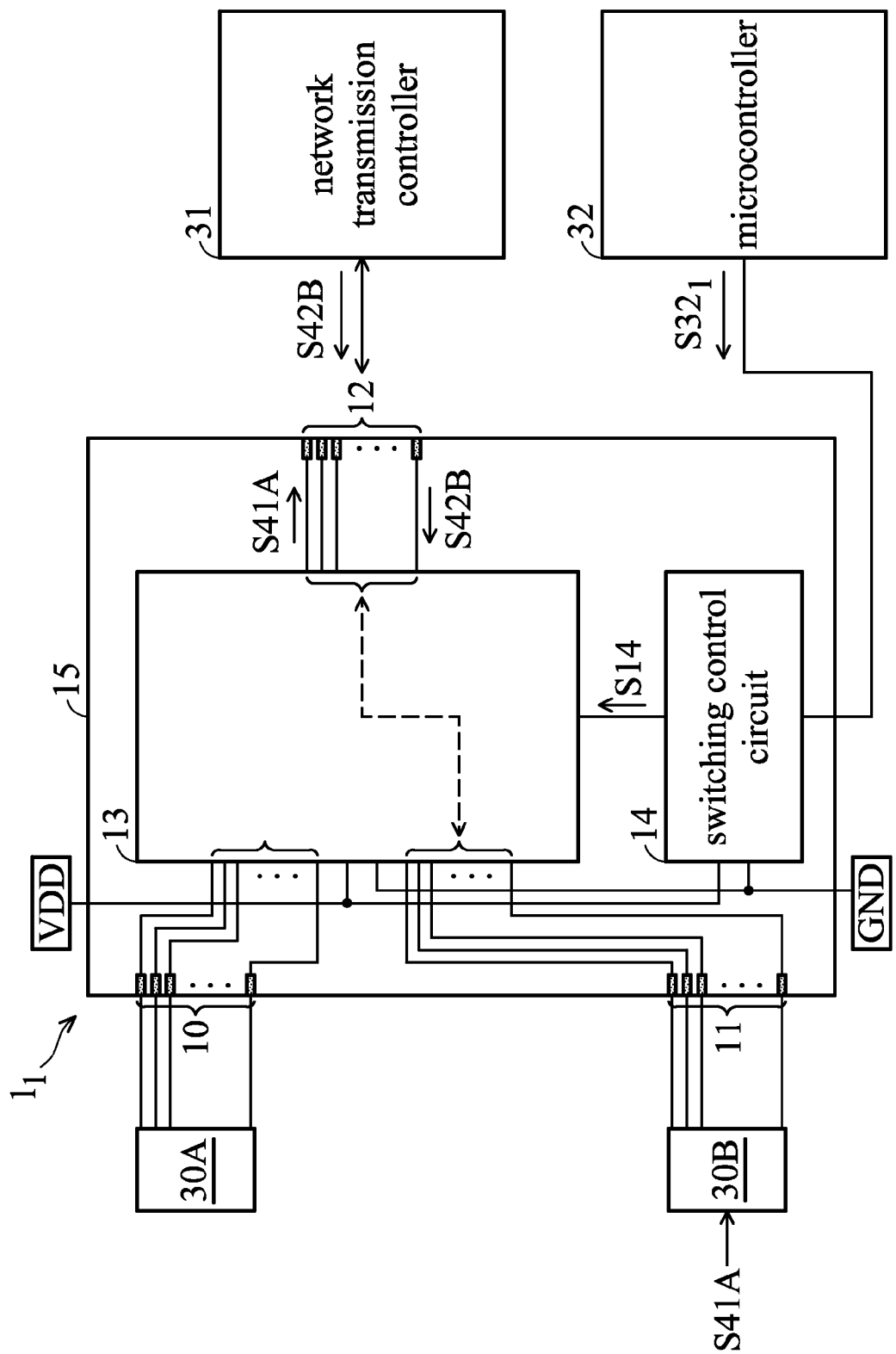
Figure 4C:
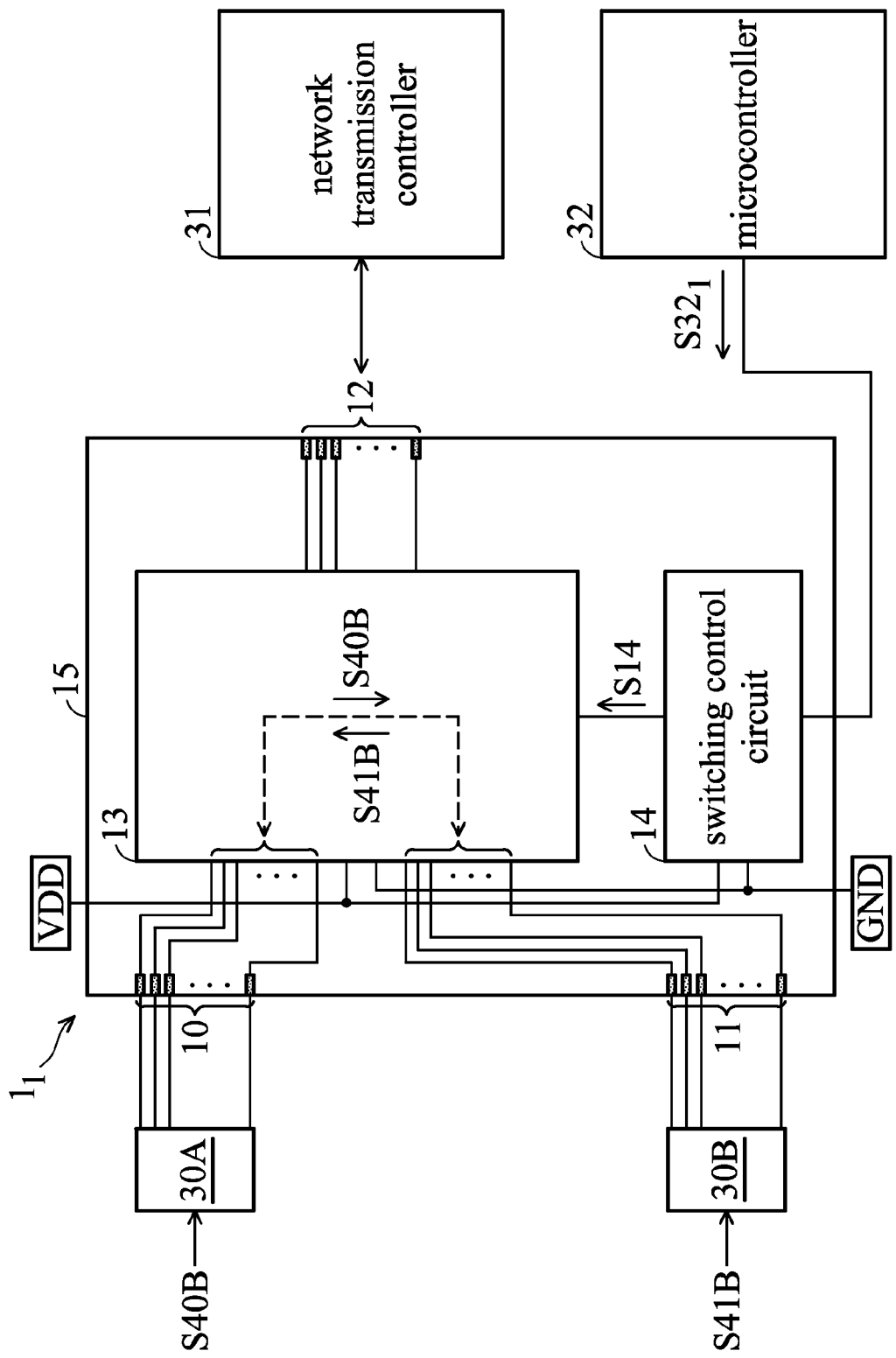

FIG. 3 shows an exemplary embodiment of a network security device. Referring to FIG. 3, a network security device 3 comprises a plurality of bypass circuits 1, a plurality of connector pair sets 30, a network transmission controller 31, and microcontroller 32, wherein each bypass circuit 1 is integrated in a single chip. The network security device 3 can be applied to a host apparatus. A plurality of network apparatuses can be connected to the network security device 3 through the connector pair sets 30. Each bypass circuit 1 controls signal transmission between one connector pair set 30 and the network transmission controller 31, such that the network transmission controller 31 can perform secure signal transmission between connector pair sets, that is the network security device 3 can perform network secure machine between the network apparatuses. In the embodiment of FIG. 3, each connector pair set 31 corresponds to one bypass circuit 1. In the embodiment, three connector pair sets 30$_1$-30$_3$ and three bypass circuits 1$_1$-1$_3$ are given as an example. The circuit structure of each of the bypass circuits 1$_1$-1$_3$ is the same as that of the bypass circuit 1 in FIG. 1, and, thus, the description related to the circuit structure of the bypass circuits 1$_1$-1$_3$ is omitted here. In the following, the operation of the network security device 1 will be described by taking the connector pair set 30$_1$ and the bypass circuit 1$_1$ as an example. Moreover, in order to clearly illustrate the operation of the network security device 3, FIGS. 4A-4C simply show the bypass circuit 1$_1$, the connector pair set 30$_1$, the network transmission controller 31, and the microcontroller 32. The entire structure and elements of the network security device 3 are shown in FIG. 3.

Referring to FIG. 3, the connector pair set 30$_1$ comprises connectors 30A and 30B. The pin set 10 of the bypass circuit 1$_1$ is coupled to the connector 30A, and the pin set 11 thereof is coupled to the connector 30B. The switching circuit 13 of the bypass circuit 1$_1$ performs the signal transmission between the pin set 10/11 and the output pin set 12 or between the pin set 10 and the pin set 11. In other words, the bypass circuit 1$_1$ performs the switching operation to achieve the signal transmission between the connector 30A/30B and the network transmission controller 31. For example, referring to FIG. 4A, when the switching circuit 13 is in a switching state applied to achieve the transmission path between the pin set 10 and the output pin set 12, an input signal S40A which is provided from the outside of the bypass circuit 1$_1$ (that is the outside of the single chip 15), transmitted through the connector 30A and received by the pin set 10 is transmitted to the output pin set 12, and another input signal S42A which is provided from the outside of the bypass circuit 1$_1$, generated by the network transmission controller 31, and received by the output pin set 12 is transmitted to the pin set 10. Similarly, referring to FIG. 4B, when the switching circuit 13 is in a switching state applied to achieve the transmission path between the pin set 11 and the output pin set 12, an input signal S41A which is provided from the outside of the bypass circuit 1$_1$, transmitted through the connector 30B, and received by the pin set 11 is transmitted to the output pin set 12, and another input signal S42B which is provided from the outside of the bypass circuit 1$_1$, generated by the network transmission controller 31, and received by the output pin set 12 is transmitted to the pin set 11. In another case, referring to FIG. 4C, when the switching circuit 13 is in a switching state applied to achieve the transmission path between the pin set 10 and the pin set 11, an input signal S40B which is provided from the outside of the bypass circuit 1$_1$, transmitted through the connector 30A, and received by the pin set 10 is transmitted to the pin set 11, and another input signal S41B which is provided from the outside of the bypass circuit 1$_1$, transmitted through the connector 30B, and received by the pin set 11 is transmitted to the pin set 10. Referring to FIGS. 3 and 4A-4C, the microcontroller 32 generates a control signal S32$_1$ to the switching control circuit 14, and the switching control circuit 14 generates the switching signal S14 according to the control signal S32$_1$ to control the switching circuit 13 to perform the above switching operation. In the embodiment, the microcontroller 32 can communicate with the host apparatus through a USB 33 and generate the control signal S32$_1$ according to the operation state of the host apparatus.

According to the embodiment of FIG. 1, each of the bypass circuits 1$_1$-1$_3$ in the network security device 3 is an independent single chip. For each bypass circuit, the pin sets 10 and 11, the output pin set 12, the switching circuit 13, and the switching control circuit 14 are packaged in a single chip. It can be easily understood that, in the single chip, the pin sets 10 and 11, the output pin set 12, the switching circuit 13, and the switching control circuit 14 are disposed on the same circuit substrate by the same manufacturing process. Accordingly, in the network security device 3, the circuit substrate where one bypass circuit 1 (such as the bypass circuit 1$_1$) is disposed is different from the circuit substrates where the other bypass circuits 1 (such as the bypass circuits 1$_2$-1$_3$) are disposed.

In an exemplary embodiment, the bypass circuits 1$_1$-1$_3$ receive different control signals S32$_1$-S32$_3$ respectively. The switching operation of each bypass circuit can be independently controlled according to the respective control signal. Thus, the switching states of the bypass circuits 1$_1$-1$_3$ can be different from each other.

According to the description above, one bypass circuit is integrated in a single chip. When the bypass circuit is applied to another device or apparatus (such as a network security device), since the bypass circuit is packaged in a single chip, the parameters that have to be considered are fewer and the design complexity of the circuit layout of the device or apparatus is reduced. Moreover, when the bypass circuit is integrated in a single chip by a small-size process (such as MEMS process), the entire area of the bypass circuit is reduced, and thus, the size of the device or apparatus which the bypass circuit is applied for is also reduced. Furthermore, the small-size process can induce lower power consumption of the bypass circuit. Accordingly, according to the embodiments, the bypass circuit and the device or apparatus which the bypass circuit is applied for conform to the tendency toward saved area and low power consumption in circuitry design, which induces better economic benefit.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A network security device comprising:
   a plurality of connector pair sets;
   a network transmission controller performing secure signal transmission between the plurality of connector pair sets; and
   a plurality of bypass circuits, each coupled to one of the plurality of connector pair sets,
   wherein each of the plurality of bypass circuits controls signal transmission between the network transmission controller and one of the plurality of connector pair sets, and
   wherein each of the plurality of bypass circuits is integrated in a single chip and comprises:
   a first pin set coupled to a first connector of the corresponding connector pair set to receive a first input signal from the first connector;
   a second pin set;
   an output pin set coupled to the network transmission controller; and
   a switching circuit coupled to the first pin set and transmitting the first input signal to the second pin set or the output pin set.

2. The network security device as claimed in claim 1, wherein for each of the plurality of bypass circuits, the first pin set, the second pin set, the output pin set, and the switching circuit are disposed on the same circuit substrate.

3. The network security device as claimed in claim 2, wherein for each of the plurality of bypass circuits, the circuit substrate where the first pin set, the second pin set, the output pin set, and the switching circuit are disposed is different from the circuit substrates where the first pin sets, the second pin sets, the output pin sets, and the switching circuits of the other bypass circuits are disposed.

4. The network security device as claimed in claim 2, wherein each of the bypass circuits further comprises:
   a switching control circuit controlling the switching circuit to transmit the input signal to the second pin set or the output pin set.

5. The network security device as claimed in claim 4 further comprising:
   a microcontroller generating a plurality of control signals to the switching control circuits of the plurality of bypass circuits, respectively,
   wherein each switching control circuit controls the switching circuit according to the corresponding control signal.

6. The network security device as claimed in claim 1, wherein for each of the plurality of bypass circuits, the switching circuit comprises:
   a plurality of relay circuits coupled between the first pin set, the second pin set, and the output pin set.

7. The network security device as claimed in claim 1, wherein each of the plurality of bypass circuits is integrated in the single chip by a microelectromechanical system (MEMS) process.

8. The network security device as claimed in claim 1, wherein for each of the plurality of bypass circuits, the second pin set is coupled to a second connector of the corresponding connector pair set to receive a second input signal from the second connector, and the switching circuit is coupled to the second pin set to transmit the second input signal to the first pin set or the output pin set.

* * * * *